United States Patent
Nogami et al.

(10) Patent No.: US 7,036,133 B2
(45) Date of Patent: Apr. 25, 2006

(54) BIAXIAL ACTUATOR FOR OPTICAL PICKUP AND OPTICAL PICKUP

(75) Inventors: Toyoshi Nogami, Osaka (JP); Teruaki Sogawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 131 days.

(21) Appl. No.: 10/685,395

(22) Filed: Oct. 16, 2003

(65) Prior Publication Data

US 2004/0081065 A1    Apr. 29, 2004

(30) Foreign Application Priority Data

Oct. 21, 2002    (JP) ............................ P2002-305345

(51) Int. Cl.
*G11B 7/085* (2006.01)

(52) U.S. Cl. ..................................... 720/683
(58) Field of Classification Search ................ 720/683, 720/672, 677, 688, 689; 369/219, 224, 225, 369/247; 359/819, 814

See application file for complete search history.

(56) References Cited

U.S. PATENT DOCUMENTS

| | | | |
|---|---|---|---|
| 5,877,904 A * | 3/1999 | Kawano et al. | 359/824 |
| 6,683,839 B1 * | 1/2004 | Ichihara et al. | 720/683 |
| 2001/0038581 A1 * | 11/2001 | Kawano et al. | 369/44.16 |
| 2003/0231411 A1 * | 12/2003 | Nakagawa | 359/819 |

FOREIGN PATENT DOCUMENTS

| | | |
|---|---|---|
| JP | 8-194962 | 7/1996 |
| JP | 11-66585 | 3/1999 |

\* cited by examiner

*Primary Examiner*—Allen Cao
(74) *Attorney, Agent, or Firm*—Morgan Lewis & Bockius LLP

(57) ABSTRACT

In a biaxial actuator for an optical pickup, rising pieces are bend-formed on a base member on which a lens holder having an objective lens is placed in such a way as to be able to displace in a focusing direction and in a tracking direction. The strength of the base member is increased by setting the width of the bend-formed portion at the root of each of the rising pieces in such a way as to be larger than the width of any other part of the associated rising piece. Preferably, the shape of a side elevation section of each of the rising pieces is set to be a trapezoid.

4 Claims, 4 Drawing Sheets

FIG.4   PRIOR ART
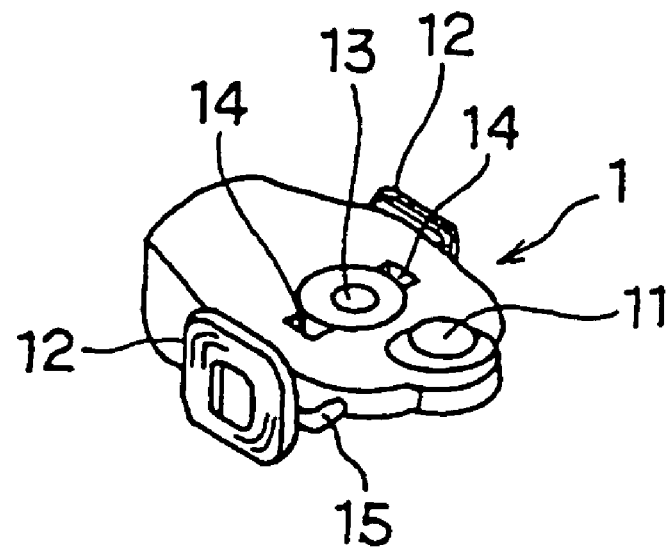
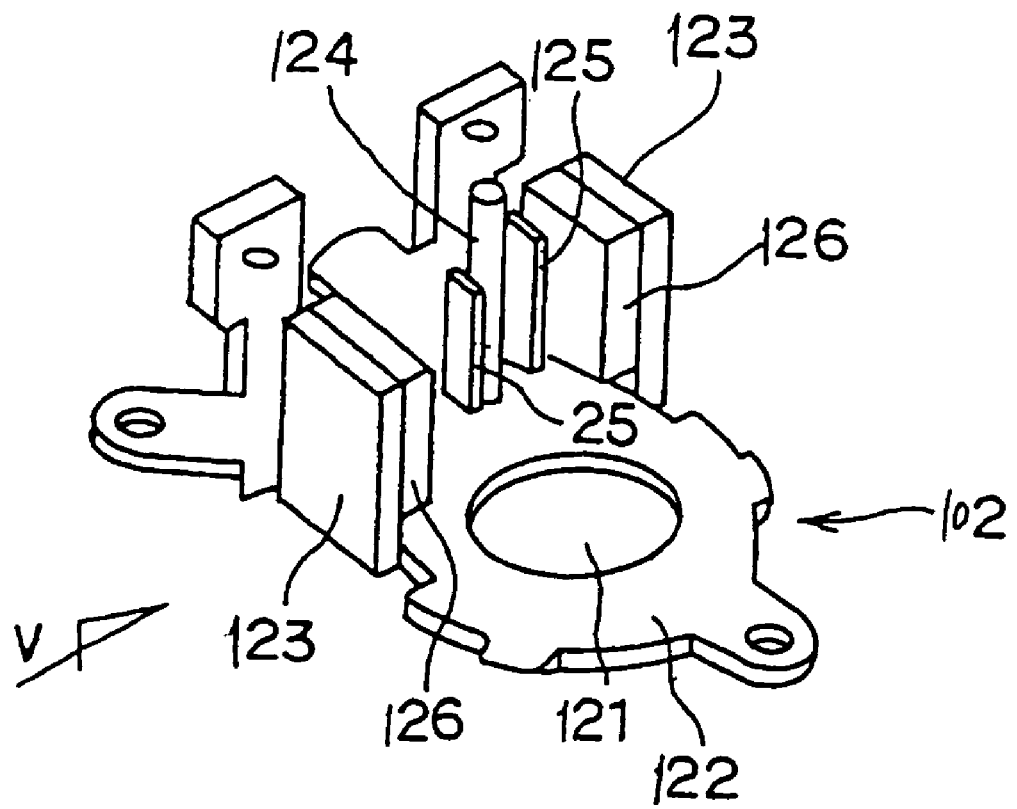

BIAXIAL ACTUATOR FOR OPTICAL PICKUP AND OPTICAL PICKUP

BACKGROUND OF THE INVENTION

1. Field of the Invention

The present invention relates to a biaxial actuator for an optical pickup, which is used for recording a signal on and reproducing a signal from discs, such as a compact disc (CD), a mini-disc (MD), and a digital versatile disc (DVD). More particularly, the invention relates to a biaxial actuator for an optical pickup, which is enabled to improve the frequency characteristic by increasing the strength of a base member to which a lens holder is attached.

2. Description of the Related Art

FIG. 4 is an exploded perspective view illustrating a conventional biaxial actuator. This biaxial actuator is provided with a lens holder 1, which has an objective lens 11, a tracking coil 15, and a focusing coil 12, and a base member 102. The base member 102 has a pair of symmetrical rising pieces 123, 123 bend-formed at both sides of a bottom plate portion 122 having a beam passing aperture 121 so as to upwardly extend, a spindle portion 124 upwardly extending from the bottom plate portion 122, and a pair of projecting piece portions 125, 125 disposed in such a manner as to sandwich this spindle portion 124 from both sides thereof. A magnet 126 is attached to the inner surface of each of the pair of rising pieces 123, 123.

Further, a hole portion 13 provided in the lens holder 1 is fitted onto the spindle portion 124 of the base member 102 so that the spindle portion 124 can freely slide in an axial direction and rotate in a circumferential direction. Furthermore, a magnetic element is provided in the lens holder 1. This magnetic element is subjected to suction action of each of the right and left magnets 126, 126 provided on the base member 102. Consequently, the lens holder 1 is held in a floating state on an axial middle part of the spindle portion 124.

In this biaxial actuator, the lens holder 1 is controlled by electromagnetic action, which is caused by cooperation among the focusing coil 12, the tracking coil 15, and the magnets 126, in such a way as to displace in a focusing direction (that is, an axial direction) and in a tracking direction (that is, a rotating direction).

In the conventional biaxial actuator of this configuration, each of the left and right rising pieces 123 of the base member 102, to which the magnets 126 are attached, is formed so that a side elevation section thereof is rectangular, that is, the section extending from the top end 127 to the bend-formed root portion 128 has a same width over the whole height thereof, as shown in FIG. 5, and that the contours of the front and rear edges 129, 129 of each of the rising pieces 123 are constituted by straight lines that are perpendicular to the bottom plate portion 122.

On the other hand, recently, there has been promoted high increase in the recording density, at which information is recorded on an optical disc serving as a recording medium for audio visual equipment (AV equipment). Along with this, an optical pickup for reading the recorded information has been requested to improve the frequency characteristic thereof and to meet the demand for high increase in the recording density at which information is recorded on a disc.

Under such circumstances, hitherto, it has been known that the resonance frequency characteristic of an optical pickup is improved by increasing the stiffness of a moving part thereof, concretely, a lens holder. Further, it has been proposed as a concrete measure (see, for example, JP-A-11-66585) to glue a reinforcing member, which is made of a material, whose stiffness is higher than that of the lens holder, to the lens holder that serves as the moving part. Moreover, there has been proposed another measure (see, for instance, JP-A-8-194962), which increases the stiffness of the lens holder by setting the thickness of the root of an objective lens mounting portion of the lens holder. The root is protruded in a cantilevered shape.

However, in the conventional biaxial actuator described by referring to FIGS. 4 and 5, the rising pieces 123 of the base member 102, to which the magnets 126 serving as elements for controlling the lens holder 1 in such a way as to displace in a focusing direction (an axial direction) and in a tracking direction (a rotating direction) are respectively attached, are shaped so that the side elevation section of each of the rising pieces 123 is shaped like a rectangle, more concretely, a rectangle elongated in the direction of height thereof. It has been found that thus, the rising pieces 123 are apt to resonate when information is read from a disc on which information is recorded at a high recording density.

It has been considered useful for solving this problem to increase the stiffness thereof by applying ideas described in the aforementioned JP-A-11-66585 and JP-A-8-194962, that is, by gluing high-stiffness reinforcing members to the rising pieces 123, or by setting the rising pieces 123 to be thick.

However, in the case of forming the left and right rising pieces 123, 123 by bending both side portions in the width direction of the bottom plate portion 122 of the base member 102, as described with reference to FIG. 4 or FIG. 5, the thickness of the entirety of a metal plate used for manufacturing the base member 102 should be set to be thick so as to realize thick rising pieces 123. This causes a problem in that a steep rise in the manufacturing cost of the base member 102 occurs.

SUMMARY OF THE INVENTION

The invention is accomplished in view of the aforementioned circumstances and problems. Accordingly, an object of the invention is to improve the frequency characteristic of an optical pickup by increasing the stiffness of rising pieces, which are formed by bending a metal plate used for manufacturing a base member, without gluing high-stiffness reinforcing members to the rising pieces of the base member, and without setting the metal plate to be thick.

To achieve the foregoing object of the invention, according to an aspect of the invention, there is provided A biaxial actuator for an optical pickup, including: a lens holder having an objective lens, a tracking coil and a focusing coil; and a base member on which the lens holder is placed in such a way as to be able to displace in a focusing direction and in a tracking direction, the base member having bend-formed rising pieces each having a magnet opposed to the focusing coil; wherein the lens holder is controlled in such a way as to displace in the focusing direction and in the tracking direction; and strength of the base member is enhanced by widening a bend-formed portion provided at a root of each of the rising pieces in such a way as to be wider than width of any other part thereof. In this biaxial actuator, strength of the base member is enhanced by widening a bend-formed portion provided at a root of each of the rising pieces in such a way as to be wider than width of any other part thereof.

With this configuration, the stiffness of each of the rising pieces bend-formed on the base member is enhanced without setting a metal plate, which is to be used for manufacturing the base member, to be thick. Consequently, the frequency characteristic of the optical pickup is improved. The optical pickup is facilitated to deal with high increase in the recording density at which information is recorded on a disc.

According to the invention, it is desirable that the width of a widened portion of each of the rising pieces increases toward the bend-formed portion provided at the root thereof. Consequently, the strength imparted to each of the rising pieces increases toward the root thereof. Thus, the vibration characteristic of each of the rising pieces is effectively improved. Hence, the frequency characteristic of the optical pickup is considerably improved.

According to the invention, preferably, each of the rising pieces may be divided into an attaching division, to which an associated one of the magnets is attached, and a lower division extending from the attaching portion to the root thereof. Moreover, the entire lower division may be formed as the widened portion. Consequently, the stiffness of the rising pieces is increased by setting the length of the attaching division, to which the magnet is attached, of each of the rising pieces to be substantially equal to that of an associated part of each of the rising pieces of the conventional actuator described with reference to FIG. 4 or 5. Thus, the improvement of the frequency characteristic of the optical pickup is enabled by increasing the stiffness of the rising pieces without enlarging a space occupied by the rising pieces. Consequently, an occurrence of a situation, in which an installation space of components other than the rising pieces is narrowed by the rising pieces, is prevented.

According to another aspect of the invention, there is provided a biaxial actuator for an optical pickup, including: a lens holder having an objective lens, a tracking coil and a focusing coil; and a base member on which the lens holder is placed in such a way as to be able to displace in a focusing direction and in a tracking direction, the base member having bend-formed rising pieces each having a magnet opposed to the focusing coil; wherein the lens holder is controlled in such a way as to displace in the focusing direction and in the tracking direction; and strength of the base member is enhanced by widening each of the rising pieces, which extends from a top end to a bend-formed portion provided at a root thereof, so that width of each of the rising pieces increases toward the root over whole height thereof. In this case, similarly, the strength imparted to each of the rising pieces increases toward the root thereof. Thus, the vibration characteristic of each of the rising pieces is effectively improved. Consequently, the frequency characteristic of the optical pickup is considerably improved.

BRIEF DESCRIPTION OF THE DRAWINGS

FIG. 4 is an exploded perspective view illustrating a conventional biaxial actuator.

DETAILED DESCRIPTION OF THE PREFERRED EMBODIMENTS

Figure 1:
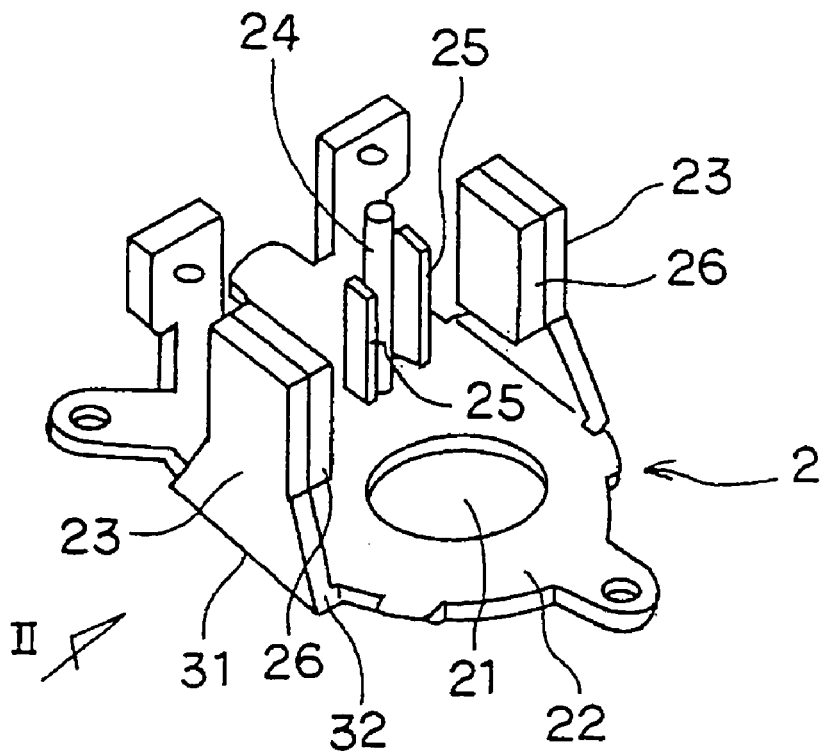
FIG. 1 is a schematic perspective view illustrating a base member used in an optical pickup according to an embodiment of the invention.
Figure 2:
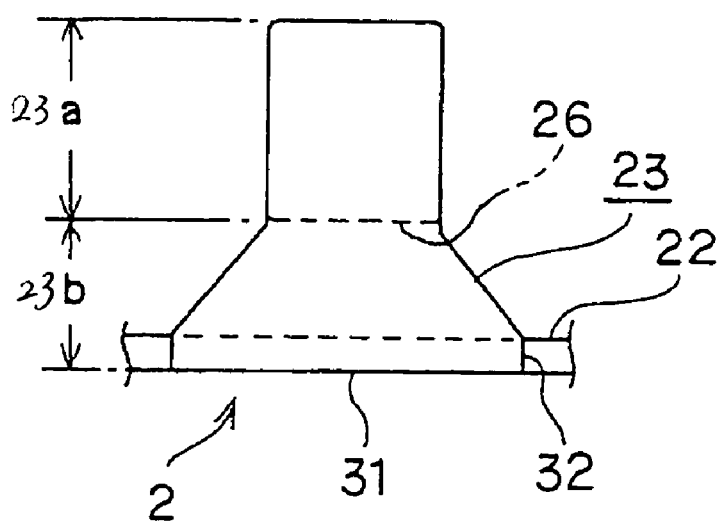
FIG. 2 is an enlarged view when viewed from a direction of an arrow II shown in FIG. 1.

FIG. 1 is a schematic perspective view illustrating a base member 2 used in an optical pickup according to an embodiment of the invention. FIG. 2 is an enlarged view when viewed from a direction of an arrow II shown in FIG. 1.

Figure 5:
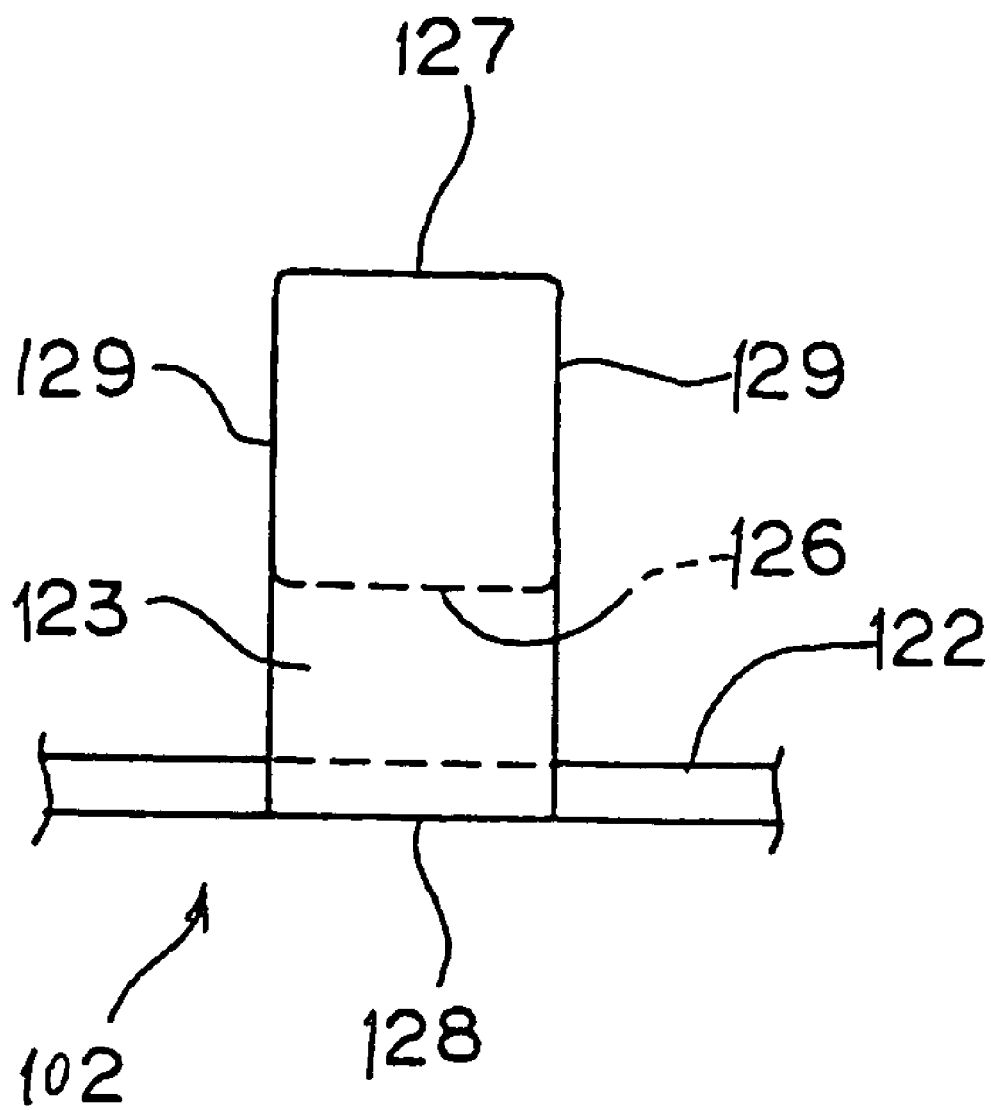
FIG. 5 is a side view illustrating the shape of each of rising pieces of a base member shown in FIG. 4.

A base member 2 shown in FIG. 1 is constituted by constituent elements similar to those of the conventional base member 102 described by referring to FIG. 4 or 5. However, the shape of a side elevation section of rising pieces 23, 23 each formed in such a manner as to be symmetrical is different from that of the rising pieces shown in FIG. 4 or 5. That is, this base member 2 has a pair of symmetrical rising pieces 23, 23 bend-formed at both sides of a bottom plate portion 22, which has a beam passing aperture 21, in such a way as to upwardly extend, a spindle portion 24 upwardly extending from the bottom plate portion 22, and a pair of projecting piece portions 25, 25 disposed in such a manner as to sandwich this spindle portion 24 from both sides thereof. A magnet 26 is attached to the inner surface of each of the pair of rising pieces 23, 23.

Further, as shown in FIGS. 1 and 2, each of the rising pieces 23 is divided into an upper division 23a, to which the magnet 26 is attached, and a lower division 23b extending downwardly from the attaching division 23a to the root 31 of this rising piece 23. The upper division 23a is formed in such a way as to have a size nearly equal to the size of the rectangular magnet 26. Moreover, the entire lower division 23b is provided in such a way as to be wider than the attaching division 23a. More concretely, the bend-formed portion 32 provided at the root 31 of the rising piece 23 is formed in such a manner as to be wider than any other part of the rising piece 23, that is, wider than the width of the attaching division 23a. Furthermore, the lower division 23b, which is a widened portion, is formed like a trapezoid, so that the width of the lower division 23b increases toward the bend-formed portion 32 provided at the root 31.

In the case where the pair of symmetrical rising pieces 23, 23 bend-formed at both sides of the bottom plate portion 22 of the base member 2 is formed so that the side elevation section of each of the rising pieces 23, 23 has the aforementioned shape, the stiffness of each of the rising pieces 23, 23 increases even when the thickness of a metal plate to be used for forming the base member 2 is not set to be large. Furthermore, the strength of the entire base member 2 increases. Thus, the rising pieces 23, 23 become hard to vibrate. Consequently, the frequency characteristic of the optical pickup is improved, so that the optical pickup is facilitated to cope with high increase in the recording density at which information is recorded on a disc. Further, the stiffness of the rising pieces 23 is increased by setting the length of the attaching division 23a of each of the rising pieces 23 to be substantially equal to that of an associated part of each of the rising pieces 23 of the conventional actuator described with reference to FIG. 4 or 5. Thus, this embodiment has advantages in that the improvement of the frequency characteristic of the optical pickup is enabled by increasing the stiffness of the rising pieces 23 without enlarging a space occupied by the rising pieces 23, and that consequently, an occurrence of a situation, in which an installation space of components other than the rising pieces 23 is narrowed by the rising pieces 23, is prevented.

Figure 3:
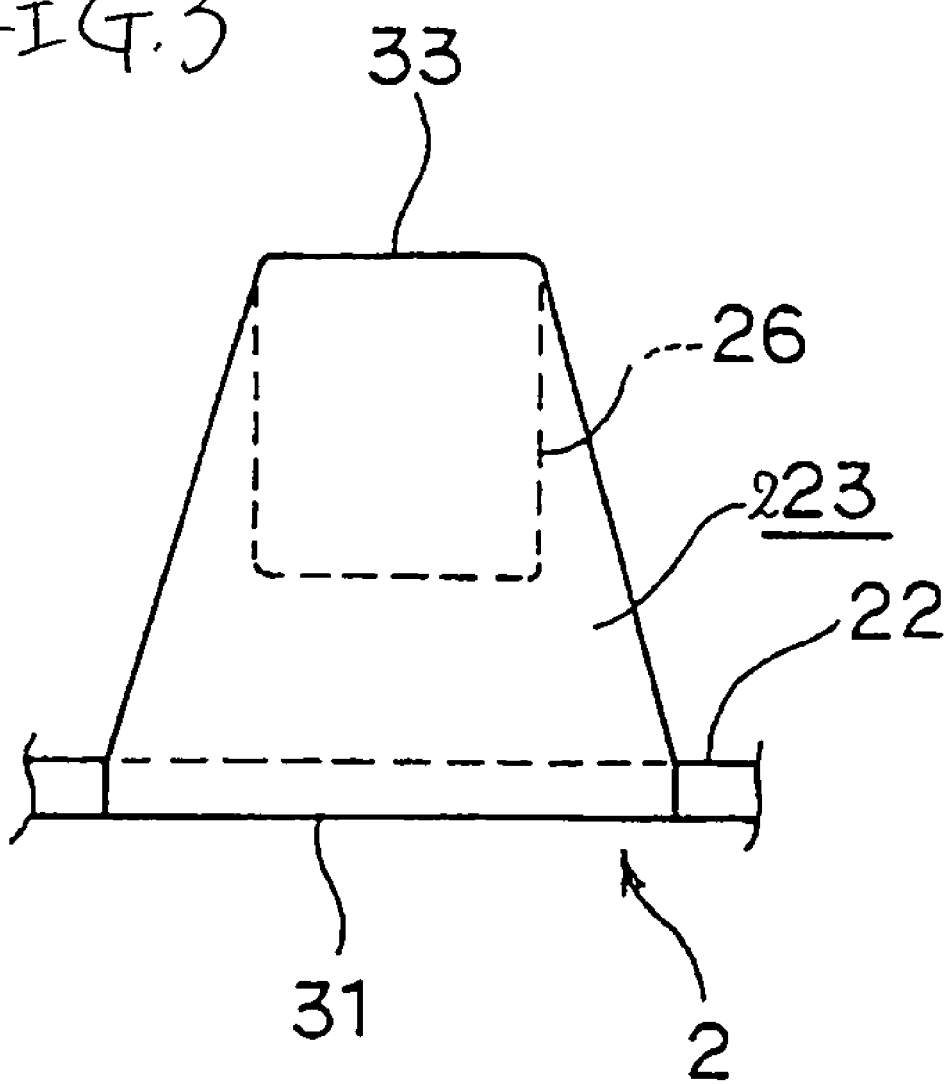
FIG. 3 is a side view illustrating the shape of each of rising pieces of a base member according to another embodiment.

FIG. 3 illustrates another embodiment. In this example, each of the entire rising pieces 223 is shaped into a trapezoid. The strength of the base member 2 is enhanced by increasing the width so that each of the rising pieces 223 extending from the top end 27 to the bend-formed root portion 28 is enlarged in width toward the bend-formed portion 32, which is provided at the root 31, over the whole height thereof. Consequently, the strength is imparted to each of the rising pieces 23 in such a way as to increase toward the root. Thus, the vibration characteristic of each of the rising pieces 223 is effectively improved, so that the frequency characteristic of the optical pickup is noticeably improved.

A lens holder 1, which is the same as that described by referring to FIG. 4, is attached to the base member 2 described with reference to FIGS. 1 to 3. That is, a hole portion 13 of the lens holder 1 having an objective lens 11, a tracking coil 15 and a focusing coil 12 is fitted onto a spindle portion 24 of the base member 2 in such a way as to freely slide in an axial direction and as to freely rotate in a circumferential direction. In addition, openings 14, 14 provided at both sides of the hole portion 13 are loosely fitted onto projecting piece portions 25, 25 of the base member 2, respectively. Further, the lens holder 1 is provided with a magnetic element. This magnetic element is subjected to suction action of each of the right and left magnets 26, 26 provided on the base member 2. Consequently, the lens holder 1 is held in a floating state on an axial middle part of the spindle portion 24. Furthermore, the lens holder 1 is controlled by electromagnetic action, which is caused by cooperation among the focusing coil 12, the tracking coil 15, and the magnets 26, in such a way as to displace in a focusing direction (an axial direction) and in a tracking direction (a rotating direction).

The biaxial actuator of the optical pickup according to the invention is not limited to each of the embodiments described with reference to FIGS. 1 to 3. As long as the strength of the base member 2 is enhanced by increasing the width thereof in such a way as to be wider than the width of any other part of the rising pieces 23, such an actuator may be employed. With such a configuration, the strength imparted to the rising pieces 23 is increased toward the root. Consequently, the vibration characteristic of the rising pieces 23 is effectively improved. Thus, the frequency characteristic of the optical pickup is improved, so that the optical pickup is facilitated to deal with the high increase in the recording density at which information is recorded on a disc.

Incidentally, in FIGS. 1 to 3, same or corresponding parts are designated by same reference characters.

As described above, according to the invention, the frequency characteristic of an optical pickup is improved by increasing the stiffness of rising pieces thereof, which are formed by bending a metal plate used for manufacturing a base member, without gluing high-stiffness reinforcing members to the rising pieces of the base member, and without setting the metal plate to be thick. Consequently, the invention can deal with the high increase in the recording density at which information is recorded on a disc. Thus, the invention provides a biaxial actuator of an optical pickup, which is enabled to deal with the high increase in the recording density at which information is recorded on a disc, at low cost.

What is claimed is:

1. A biaxial actuator for an optical pickup, comprising:
a lens holder having an objective lens, a tracking coil and a focusing coil; and
a base member on which the lens holder is placed in such a way as to be able to displace in a focusing direction and in a tracking direction, the base member having bend-formed rising pieces each having a magnet opposed to the focusing coil;
wherein the lens holder is controlled in such a way as to displace in the focusing direction and in the tracking direction; and
strength of the base member is enhanced by widening each of the rising pieces, which extends from a top end to a bend-formed portion provided at a root thereof, so that width of each of the rising pieces increases toward the root over whole height thereof;
wherein each of the rising pieces having an attaching division, to which the magnet is attached, and a lower division, the attaching division having a size nearly equal to the size of the magnet and the lower division being wider than the attaching division.

2. A biaxial actuator for an optical pickup, comprising:
a lens holder having an objective lens, a tracking coil and a focusing coil; and
a base member on which the lens holder is placed in such a way as to be able to displace in a focusing direction and in a tracking direction, the base member having bend-formed rising pieces each having a magnet opposed to the focusing coil;
wherein the lens holder is controlled in such a way as to displace in the focusing direction and in the tracking direction; and
strength of the base member is enhanced by widening a bend-formed portion provided at a root of each of the rising pieces in such a way as to be wider than width of any other part of the rising piece;
wherein each of the rising pieces having an attaching division, to which the magnet is attached, and a lower division, the attaching division having a size nearly equal to the size of the magnet and the lower division being wider than the attaching division.

3. The biaxial actuator for an optical pickup according to claim 2, wherein width of a widened portion of each of the rising pieces increases toward the bend-formed portion provided at the root of the rising piece.

4. An optical pickup comprising:
a lens holder having an objective lens, a tracking coil and a focusing coil; and
a base member on which the lens holder is placed in such a way as to be able to displace in a focusing direction and in a tracking direction, the base member having bend-formed rising pieces each having a magnet opposed to the focusing coil;
wherein the lens holder is controlled in such a way as to displace in the focusing direction and in the tracking direction; and
strength of the base member is enhanced by widening a bend-formed portion provided at a root of each of the rising pieces in such a way as to be wider than width of any other part of the rising piece;
wherein each of the rising pieces having an attaching division, to which the magnet is attached, and a lower division, the attaching division having a size nearly equal to the size of the magnet and the lower division being wider than the attaching division.

* * * * *